United States Patent [19]

Klees

[11] 3,716,251
[45] Feb. 13, 1973

[54] VEHICLE PITCH CONTROL DEVICE
[75] Inventor: Gerard T. Klees, Rochester, Mich.
[73] Assignee: General Motors Corporation, Detroit, Mich.
[22] Filed: July 19, 1971
[21] Appl. No.: 163,833

[52] U.S. Cl. ........280/124 F, 280/124 LR, 267/65 D
[51] Int. Cl. ............................................B60g 17/04
[58] Field of Search ................280/124 F, 124 LR, 6

[56] References Cited

UNITED STATES PATENTS 2,954,237  9/1960  Sampietro........................280/124 F Primary Examiner—Philip Goodman
Assistant Examiner—John Carroll
Attorney—W. S. Pettigrew et al.

[57] ABSTRACT

A preferred embodiment of a pitch control device for a vehicle leveling system includes a pair of leveler unit associated with primary suspension springs in the rear suspension of a vehicle. The pitch control includes sensing bellows at the front and at the rear of the vehicle which are operative to produce a pressure differential when the vehicle frame and chassis are pitched either from front to rear or from rear to front of the car and wherein a valve controller responds to the pressure differential to regulate the levelers to compensate for the pitched relationship. Other embodiments are illustrated.

6 Claims, 6 Drawing Figures

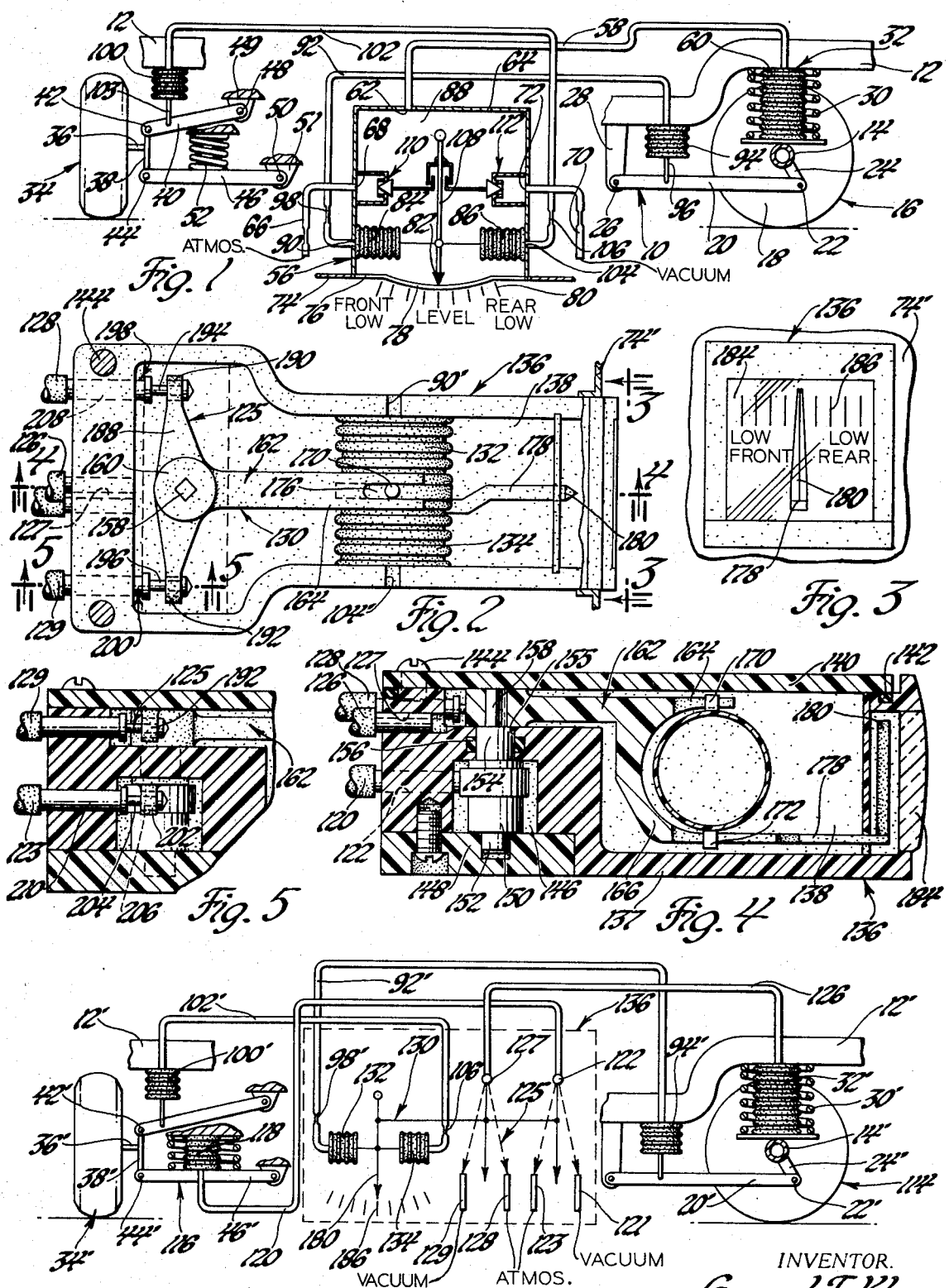

VEHICLE PITCH CONTROL DEVICE

This invention relates to automatic vehicle leveling systems and more particularly to an automatic vehicle leveling system that compensates for changes in load and that also compensates for changes in the pitch attitude of the vehicle.

Automatic leveling systems utilizing either a vacuum leveler unit or a pressurized hydraulic or air pressure leveler unit often include a pair of levelers located between the rear axle housing of a vehicle and the frame thereof. These systems are operative to produce a supplemental load carrying capacity in addition to that of the primary suspension springs of the vehicle to maintain a desired height relationship between the car chassis and the axle assembly.

In such systems the car frame and chassis are maintained essentially level when the car is either loaded or unloaded between a curb height load weight and a full rated load condition. However, there are cases where greater loads are concentrated rearward of the axle of the car; for example, in a station wagon cargo area or in the trunk of a sedan. This can cause the front end of the vehicle to pitch upwardly even though the rear height of the car is maintained by the leveler units.

An object of the present invention is to provide a system for determining the pitch relationship of a vehicle chassis and to provide means for regulating the operative condition of load leveler units so that the car pitch can be compensated.

A further object of the present invention is to improve automatic vehicle leveling systems of the type including at least a pair of load leveler units that are adapted to be connected between the sprung and unsprung mass of the vehicle and operated to maintain a predetermined rear standing height relationship by the provision of pitch compensating means responsive to sensor means which produce a correction signal corresponding to the height relationship between the sprung and unsprung mass at the front of the vehicle and a like relationship between the sprung and unsprung mass at the rear of the vehicle.

Yet another object of the present invention is to provide a combined indicator and control arrangement for indicating the pitch relationship of the vehicle from the front to the rear thereof and including means for automatically compensating for vehicle pitch by varying the operation of a leveler unit in an auxiliary load leveling system which is operative to maintain a predetermined rear vehicle height.

These and other objects of the present invention are obtained in one working embodiment which includes a pair of primary suspension springs between the axle housing of a vehicle and the rear frame portion of the vehicle chassis. A pair of leveler units in the rear suspension produce an auxiliary load supporting capacity.

In a preferred form, the leveler units are vacuum operated and pulled down against the force of the primary springs to maintain a predetermined height relationship between the vehicle frame and the rear axle housing. The leveler units are selectively connected to a source of vacuum or to atmosphere by a control valve which is operated by a pair of opposed bellows connected to a first pitch sensor bellows located between the sprung and unsprung mass at the front of the vehicle and a second pitch sensor bellows located between the sprung and unsprung mass at the rear of the vehicle.

When the vehicle is at a level curb position and unloaded, the pressure in the pitch sensing bellows are equal, front and rear.

Between an unloaded and a full rated load, the leveling system is capable of maintaining a substantially level vehicle under conditions where load is uniformly distributed in the vehicle. However, when a heavy load is concentrated rearwardly of the rear axle of the vehicle, for example in a station wagon cargo area or a sedan trunk, the front can be raised or pitched upwardly. When this occurs, the sensing bellows produce a pressure unbalance signal which indicates the high front pitch attitude. The opposed bellows receive the signal and operate the control valve to regulate the leveler unit pressure to compensate for the high pitch condition.

A vacuum leveler unit will compensate the case of a heavy load in the trunk or rearward of the axle and a front that is too as follows. First, the pair of bellows produce a pressure unbalance on the control valve to cause an atmospheric port to the leveler units to be opened. This reduces the vacuum in the leveler unit and causes the rear of the car to be raised by the primary coil springs. This causes the rear height sensing bellows pressure to increase to that in the front sensing bellows until the front and rear signal pressures are balanced. At this point, the control valve is returned to a balanced, closed position. When the load is removed, the reverse action occurs, and the vacuum port to the leveler unit is opened to cause it to pull down the rear to its level position.

The controller preferably is located on the instrument panel of a vehicle and has a scale which indicates the pitch condition. In one preferred embodiment, the indicator is a pointer that extends from a control lever of the control valve.

Further objects and advantages of the present invention will be apparent from the following description, reference being had to the accompanying drawings wherein a preferred embodiment of the present invention is clearly shown.

IN THE DRAWINGS:

FIG. 1 is a diagrammatic view of a vehicle leveling system including the combined pitch controller and indicator of the present invention;

FIG. 2 is a top elevational view of a pitch control valve and pitch read-out device used in the system of FIG. 1;

FIG. 3 is an end elevational view of the device in FIG. 2 looking in the direction of the arrows 3 — 3 in FIG. 2;

FIG. 4 is a view in vertical section taken along the line 4 — 4 of FIG. 2 looking in the direction of the arrows with a top cover of the device in place;

FIG. 5 is a fragmentary sectional view taken along the line 5 — 5 of FIG. 2 looking in the direction of the arrows with the cover in place; and FIG. 6 is a diagrammatic view of a system disclosing a second embodiment of the invention.

In FIG. 1 of the drawings, a leveling system 10 is illustrated in association with a frame 12 and axle housing 14 of a rear suspension assembly 16. A pair of ground engaging wheel and tire assemblies 18 are at either end of axle housing 14. A lower control arm 20 has the rear end thereof pivotally secured by a pin 22 to an axle housing bracket 24. The front end of arm 20 is pivotally secured by a pin 26 to a frame bracket 28.

The frame 12 is supported on the axle housing 14 by a pair of primary suspension coil springs one of which is illustrated at 30. The system 10 further includes a pair of vacuum operated leveler units one of which is indicated at 32 in association with spring 30. The spring 30 and leveler unit 32 is adjacent one end of housing 14. Another spring and leveler unit, like those illustrated are at the other end of housing 14. The units 32 pull the frame 12 downwardly against the force of the primary suspension springs 30 to maintain a predetermined rear height relationship between the frame 12 and the axle housing 14 to compensate for load changes on the vehicle.

The system 10 is also associated with a standard front suspension of a vehicle. One side of such a suspension is illustrated. It includes a ground engaging tire and wheel assembly 34 having a wheel spindle 36 that is connected to a steering knuckle 38 having the upper end thereof connected to an upper control arm 40 by means of a pivot pin 42 and the lower end connected by means of a pin 44 to one end of a lower control arm 46.

The upper control arm 40 has the opposite end thereof connected by a pivot pin 48 to a front portion 49 of the car frame and the lower control arm 46 is pivotally connected by means of a pin 50 to another portion 51 of the frame. Frame portions 49, 51 are diagrammatically illustrated as fixed reference points in the system and are movable with the front end of frame 12.

A primary suspension spring 52 is located between the upper and lower control arms 40, 46 to resiliently support the front part of the frame 12 for movement with respect to the ground engaging wheel assembly 34 and vice-a-versa. The vehicle has another front suspension side identical to that described. As illustrated, each one of the leveler units 32 are located in association with a primary suspension spring 30 to produce a supplemental or auxiliary load leveling effect to maintain a desired rear height relationship between axle housing 14 and frame 12.

Damping components or shock absorbers normally found in both rear and front suspensions of vehicles are omitted in order to more clearly set forth the inventive aspects of the system 10.

Each of the rear vacuum leveler units 32 are connected to a pressure controller device 56 by a pressure conduit 58. In each case it has one end in communication with the interior of a pressure bellows 60 that defines the side walls of the leveler unit 32 and the opposite end thereof communicating through a port 62 in a sealed controller housing 64.

The controller 56 is operative to communicate the control port 62 therein selectively with an atmospheric inlet pipe 66 which communicates through a port 68 in the housing 64. Additionally, the controller regulates the communication of a vacuum pipe 70 with a control port 72 in the housing 64.

The controller 56 is selectively operated to maintain a predetermined control of both the atmospheric pipe 66 and vacuum pipe 70 so as to maintain a pressure condition in the vacuum operator 32 to produce an auxiliary load support which accomplishes leveling of the vehicle including maintaining a predetermined level between both front and the rear of the vehicle so that the frame will not be pitched either above or below a desired plane, preferably horizontal or near horizontal.

More particularly, as best illustrated in FIG. 2, the controller 56 has its housing 64 arranged to be supported with respect to an instrument panel 74 of a vehicle so that an end face 76 of the controller 56 will be located in a readily observable position. The end face 76 includes a transparent cover 78 having indicia 80 thereon which indicates a front low level or rear low condition thereon. A movable indicator 82 is located with respect to the indicia 80 and is moved with respect thereto in accordance with operation of a pair of opposed differential pressure bellows 84, 86 which are located within a sealed chamber 88 of the housing 64.

The bellows 84 is communicated through an inlet port 90 with one end of the control conduit 92 which has the opposite end thereof connected to a rear sensing bellows 94 located with one end thereof in engagement with the rear frame 12 which represents a sprung mass portion of the rear suspension assembly 16. The opposite end of the bellows 94 is coupled through a link 96 to the control arm 20 which is part of the unsprung mass portion of the rear suspension 16.

The bellows 94 is a sealed chamber which, when the vehicle is level, has an operating pressure of 14.7 psia.

When the system is assembled, the front and rear bellows operating pressure is the ambient atmospheric pressure. Height changes will raise and lower the sensing bellows pressure.

When the vehicle rear is below a predetermined height relationship between the sprung mass portion or frame 12, and the unsprung mass portion or axle housing 14 the bellows 94 will be compressed to discharge fluid across a control orifice section 98 in the control conduit 92 to increase the pressure of the bellows 84.

Under this condition, the sprung mass portion at the vehicle front may move upward with respect to the unsprung mass portion thereof.

When this occurs, a front signal bellows 100 having one end thereof located with respect to the frame 12 at the front of the vehicle and the opposite end thereof connected by a link 102 to the upper control arm 40 or other unsprung portion of the front suspension will expand in volume to draw fluid from a control conduit 102 having one end thereof connected to the signal bellows 100 and the opposite end thereof connected through an inlet port 104 in the housing 64 to bellows 86. As fluid flows across the orifice section 106 in the control conduit 102 it will reduce the pressure in the bellows 86.

The inner ends of the bellows 84, 86 are actively connected to a member 108 which responds to the differential pressure buildup within the bellows 84, 86 to, in the case of the rear low condition, cause the indicator arm 82 to shift to the right of the scale indicated in FIG. 1.

When this occurs, the member 108 positions a first control valve 110 in an open position to communicate the sealed chamber 88 and the atmospheric pipe 66. A second valve assembly 112 is closed to seal between the sealed chamber 88 and the vacuum pipe 70.

The pressure increases in the bellows 60 of the leveler units 32 to increase the upward supportive force between the frame 12 and the rear housing portion 14 and this upward force acting in conjunction with the rear springs 30 will cause the rear end to raise.

For simplicity of explanation, it is assumed that the signal bellows are located at a position where their deflection change equals the deflection change of the sprung mass relative to the unsprung mass. For proper system operation where this condition is not realized, the following control system relationship should be met:

$$(A_c V_o/V_o - R A_s dw) \text{ Front} = (A_c V_o/V_o - R A_s dw) \text{ Rear}$$

Where:
$A_c$ = control bellows eff. area
$R$ = ratio of bellows travel to wheel travel
$A_s$ = signal bellows eff. area
$V_o$ = initial volume of control system, including control and signal bellows
$dw$ = deflection at full rated load In addition to load leveling, the system will compensate for vehicle pitch which occurs when a heavy load is located rearwardly of axle housing 14. When this condition occurs, the signal bellows 100 senses the fact that the front portion of the frame 12 is raised even further above a desired relationship with the unsprung portions of the front suspension.

A pressure unbalance is created by the further extension of the front signal bellows and the rear signal bellows will be compressed more to produce an opposed pressure differential in the control bellows 84, 86 which acts on the control member 108 to compensate for the out of pitch condition even though the rear height of the vehicle is at a desired height relationship. The correction for a high front end will maintain the atmospheric valve 110 open and the vacuum valve 112 closed so that the pressure will increase in the bellows 62 to compensate for the extra load rearwardly of the axle housing by raising the frame a slight amount while lowering the front end of the frame. When the pitch of the frame 12 is compensated, the pressure in the front and rear signal bellows 94, 100 will be balanced and the pressure within the control bellows 84, 86 will likewise be balanced so that the member 108 will assume a null or level position as illustrated in FIG. 1 at which point both of the valves 110, 112 are closed.

When the load is removed, the reverse action occurs and the vacuum port is opened to pull the rear down to its level position and the front signal bellows 100 continues to operate to assure that the frame 12 will have the desired pitch attitude.

In addition to the combined pitch and leveling control, the system of FIG. 1 enables the operator of the vehicle to continually observe the pitch of the car by means of the indicator 82 moving with respect to the indicia 80 on the window 78 which is preferably located on the dashboard or instrument panel of the car.

Another aspect of the present invention is that the front and rear signal bellows are located on the same side of the car so that road motions of the car do not cause any leveling action to take place. The only action will be changes in pitch on one side of the car which are generally representative of a like change of pitch on the other side of the car.

Another functional advantage of the system is the control of car dive during braking and squat during acceleration, which is beneficial in maintaining proper bumper heights at all time. The term pitch attitude includes attitude changes due to car dive or squat.

This basic control concept is independent of atmospheric pressure of variations thereof, and it is non-critical with respect to adjustment of system if the final assembly is made with the car at an approximate curb level position. Also, since the average operating pressure within the control system is always at or near the ambient atmospheric pressure, the pressure differential stresses are minimized which enables low-strength materials to be employed, such as plastics.

Although the leveling system described derives its energy from vacuum, other types of leveling system energy sources could be controlled by the basic conceptual technique represented by this invention.

The system can be used to alleviate diving of the car during brake stopping, so that bumper heights are maintained at all times. This controlled anti-dive is a further advantage of this invention.

Another embodiment of the invention is illustrated in FIGS. 2 and 6. In the system of FIG. 6, the vehicle has a rear suspension 114 like suspension 16 in the first embodiment. Other components of the rear axle assembly 114 which correspond to like components illustrated in the first embodiment function in the same manner and have the same reference numerals primed.

Likewise, the vehicle includes a front suspension 116 like the front suspension 34 of the first embodiment. The component parts of the front suspension 116 are identical to those in the first embodiment and carry the same reference numerals primed. However, in this embodiment of the invention additional means are provided to give an active leveling of the front suspension by the provision of at least one operative active bellows 118 which is connected between the sprung and unsprung mass components of the front suspension 116 to vary the load carrying capacity of the primary spring of the front suspension 116 to give additional pitch control in the vehicle.

More particularly, in this embodiment the active bellows 118 is connected to one end of a pressure conduit 120 which has the opposite end thereof connected to a port 122 leading to a sealed control chamber 138 which communicates through a multiple component valve assembly 125 with atmosphere or vacuum pipes 121, 123 depending upon the height relationship between the sprung and unsprung mass of the front of the car.

As was the case in the previous embodiment, the active bellows 32' in the rear assembly 114 is communicated with one end of a pressure conduit 126 which has the opposite end thereof in communication with a control port 127 which leads to a valve assembly 125 which communicates the pressure conduit 126 selectively to either an atmosphere pipe 128 or a vacuum pipe 129.

The valve assembly 125 is coupled by linkage 130 to a pair of opposed control bellows 132, 134 like the bellows 84, 86 in the first embodiment. They are connected to sensing bellows 94', 100' like those in the first embodiment through like components. The bellows 132, 134 thereby produce a differential force on linkage 130 which positions the valve assembly 125 to produce opposite leveling effects at the leveler 118 and the leveler 32' to compensate vehicle pitch.

The diagrammatically illustrated valve assembly 125 and linkage 130 are part of a controller and indicator assembly 136 shown in FIGS. 2 – 5, which more particularly includes a base portion 137 with a sealed chamber 138 therein closed by a cover 140 that engages an annular gasket 142 formed around and supported on the top edge of the base 137. The cover 140 is secured in place by screws 144.

On the other side of the base 137 is formed a second sealed chamber 147 which is closed by a bottom cover 148.

In the illustrated arrangement, the linkage 130 includes an operating shaft 150 which has a small diameter extension 152 thereon pivotally supported within the lower cover 148. Shaft 150 also includes an upper bearing surface 154 that extends through a bore 155 in the base 137. The bearing surface 154 is sealed by an annular O-ring 156 in the base bore 155.

The shaft 150 is connected at a squared, upper end portion 158 thereof to the base 160 of a yoke member 162.

The yoke 162 has an upper slotted arm 164 and a lower slotted arm 166 in which are located pins 170, 172 located on either side of a movable partition 176 formed between each of the bellows 132, 134.

An indicator stem 178 extends from the lower arm of the yoke and is connected to an upstanding arm 180 movable with respect to a window 184 on which is formed indicia 186 which indicates the pitch condition of the vehicle system in FIG. 6.

The yoke has a cross-bar 188 formed thereon with ends 190, 192 connected respectively to stems 194, 196 of Schrader type tire valves 198, 200 which control vacuum and atmospheric flow of air into the sealed chamber 138 from whence the modulated air flows through the conduit 126 to the rear leveler unit 32' for changing the height relationship between the sprung and unsprung mass portions of the rear suspension 114.

A lower cross-bar 202 like the upper cross bar has ends thereon that fit over stems 204, 206 of lower valves 208, 210 in the system which connect respectively to vacuum and atmosphere.

The modulated pressure in the chamber 146 will be directed through the control port 122 and conduit 120 to the front active bellows 118 so that during a pitch correction phase of operation when the pressure increases in the bellows 32' it decreases in the bellows 118.

Thus, the valve assembly 125 operates to produce opposed pressures to the chambers 138, 146. Hence, when leveler unit 32' acts in one direction, leveler unit 118 acts in an opposite direction to give active front and rear pitch compensation.

While the embodiments of the present invention, as herein disclosed, constitute a preferred form, it is to be understood that other forms might be adopted.

What is claimed is as follows:

1. A front-to-rear vehicle pitch compensating system comprising: a rear suspension assembly including a sprung and unsprung mass, a first load leveling device between said masses for maintaining a predetermined height at the rear of the vehicle, a first signal bellows having a pressurizable chamber therein responsive to the height relationship between the sprung and unsprung mass portions of a vehicle at the rear thereof, a front suspension having a sprung and unsprung mass, a second signal bellows connected between the sprung and unsprung masses of said front suspension, said bellows including a pressurizable chamber for sensing the height relationship between the front sprung and unsprung mass portions, a controller including valve means, fluid supply means communicating said controller and said load leveling device, means responsive to a differential pressure in said first and second signal bellows including means for operating said valve means to selectively communicate first and second pressure sources with said fluid supply means, said first valve communicating said fluid supply means with the first pressure source to cause said leveling device to produce a first supplemental load carrying force when the rear of the vehicle is low to return it to the desired predetermined height, said controller being operative to condition said valve means to communicate said fluid supply means with the second pressure source when the front of the vehicle is low to cause said leveling device to produce a second supplemental load carrying force at the rear suspension which lowers the rear to maintain a predetermined desired pitch relationship between the front and rear of the vehicle.

2. A vehicle pitch control system comprising: a rear suspension having leveler means with a pressurizable control chamber therein for producing changes in the resultant load carrying capacity thereof to maintain a desired height between the sprung and unsprung mass of the rear suspension, first signal means responsive to changes in the height relationship between the sprung and unsprung mass of the vehicle at the rear thereof to produce a first signal, second signal means responsive to changes in the height relationship between the sprung and unsprung mass of the vehicle at the front thereof for producing a second signal, valve means for selectively connecting said leveler means to first and second pressure sources, valve actuator means for controlling said valve means in accordance with signals from said first and second signal means, said valve actuator means operating said valve means to disconnect said leveler means and said first and second pressure sources when the car pitch is level, said valve actuator means responding to a differential signal between said first and second signal means corresponding to a low front end pitch conuition to communicate one of said pressure sources with said leveler means to reduce the height relationship between the sprung and unsprung mass of the vehicle at the rear thereof to return the vehicle to a desired pitch attitude, said valve actuator means being responsive to a differential signal between said first and second signal means reflecting a rear low vehicle attitude to connect said leveler means with the other pressure source to increase the height relationship between the sprung and unsprung mass at the rear of the vehicle thereby to return it to a desired pitch attitude.

3. A vehicle leveler control system and pitch attitude indicator for an automobile leveling system comprising: a housing having a sealed pressure chamber, a supply conduit port to said chamber adapted to be connected to a pressurizable leveler unit of a vehicle leveling system, first and second pressure supply ports on said housing adapted to be connected to first and second pressure supplies, valve means for controlling flow from said pressure supply ports closed to said sealed chamber, valve actuator means including a level position wherein said valve means closes both of said ports, a front low operative position and a rear low operative position, said valve actuator means being operative to close one of said valve and open the other of said valves when in one low position and to open said one of said valves and to close the other of said valves when in its other operative low position to selectively connect the supply port to the load leveler unit with either said first or said second pressure supplies to change the pressure condition within the vehicle leveler unit to maintain a controlled pitch attitude between the front and rear of the vehicle, said control unit including an indicator panel thereon, indicator means connected to said valve actuator means and responsive to movement thereof into either its level or first and second low operative position to indicate the pitch relationship between the front and rear of the vehicle during operation of the control device.

4. A vehicle pitch attitude controller and indicator comprising: a first signal producing means for producing a first signal responsive to changes in the height relationship between the sprung and unsprung masses of a vehicle at the front suspension thereof, a second signal producing means for producing a second signal responsive to the changes in the height relationship between the sprung and unsprung masses of the vehicle at the rear suspension thereof, pressurizable load leveler means adapted to be connected between sprung and unsprung masses at the rear suspension and sprung and unsprung masses at the front suspension, valve means for selectively applying first and second pressure sources to the pressurizable load leveler means for maintaining a predetermined pitch relationship between the front and rear of the vehicle, valve actuator means for controlling said valve means including an operator responsive to the signals produced by said signal producing means and operative to connect said front leveler means to one of said pressure sources while connecting the rear leveler means to the other of said pressure sources to cause one of said leveler means to have an increased resultant lifting force on the sprung mass associated therewith while concurrently causing the other of said leveler means to have a reduced uplifting force on the sprung mass associated therewith thereby to produce a front to rear pitch attitude control.

5. A vehicle pitch attitude controller and indicator comprising: a first signal producing means for producing a first signal responsive to changes in the height relationship between the sprung and unsprung masses of a vehicle at the front suspension thereof, a second signal producing means for producing a second signal responsive to the changes in the height relationship between the sprung and unsprung masses of the vehicle at the rear suspension thereof, pressurizable load leveler means adapted to be connected between sprung and unsprung masses at the rear suspension and sprung and unsprung masses at the front suspension, valve means for selectively applying first and second pressure sources to the pressurizable load leveler means for maintaining a predetermined pitch relationship between the front and rear of the vehicle, valve actuator means for controlling said valve means including an operator responsive to the signals produced by said signal producing means and operative to connect said front leveler means to one of said pressure sources while connecting the rear leveler means to the other of said pressure sources to cause one of said leveler means to have an increased resultant lifting force on the sprung mass associated therewith while concurrently causing the other of said leveler means to have a reduced uplifting force on the sprung mass associated therewith thereby to produce a front to rear pitch attitude control, an indicator arm on said valve operator, said actuator means including opposed bellows for maintaining said indicator in a null position when said first and said second signals are balanced, said bellows responding to differences in said first and second signals to position said indicator arm to indicate the pitch attitude of the front and rear of the car.

6. A car pitch attitude indicator and controller device comprising: a housing having a sealed compartment therein adapted to be communicated with the pressurizable control chamber of a vehicle leveler unit, a pair of opposed bellows supported in said housing each having an inlet thereto, each of said bellows inlets adapted to be connected respectively to signal control bellows at the front and rear of the car for producing bellows operation in accordance with the height relationship between the sprung and unsprung masses of the vehicle at the front and rear thereof, a pair of pins on said bellows, a yoke having spaced arms engaging said pins and a pivoted base, a pivot shaft through said base supported by said housing, first and second inlet ports in said housing, first and second valves adapted to connect said inlet ports with a first and second source of pressure, said yoke having means thereon to operate said valves to modulate the pressure within said chamber upon bellows operation of said yoke, an indicator window with indicia thereon, and an indicator bar moved by operation of said bellows with respect to said indicia to indicate car pitch.

\* \* \* \* \*